2,890,752

NEW SQUEEZE CEMENT PROCESS AND SLURRY

Billie L. Crone and Garland L. White, Breckenridge, Tex., assignors, by mesne assignments, to B J Service, Inc., Long Beach, Calif., a corporation of Delaware No Drawing. Application September 5, 1956
Serial No. 607,978

13 Claims. (Cl. 166—22)

This invention relates to oil and gas well squeeze cementing and to an improved composition for use in this process.

Heretofore water slurries of cement have been used in various types of processes for the squeeze cementing of wells. The usual procedure is to prepare a water cement slurry and pump it into the well either with or without a packer, and then apply enough pressure to force the cement out of the well bore into the surrounding formation. This has many disadvantages, as it blocks the oil producing zone as well as the water producing zone, and wells so blocked require restimulation, which is not always successful.

A difficulty also exists in the forcing of the cement slurry into the channels in the producing formation due to the high fluid loss which causes physical dehydration and results in the packing of the cement without penetration. This increases the friction and requires excessively high pressure in order to force the cement into the desired porous formation, necessitating additional equipment, special squeeze tools and the isolation of the water producing zone. Also the excessively high pressure necessary may cause fracturing in the formation exposed thereto, thereby opening up new zones that must be blocked. Of necessity, all of these procedures block the oil producing zone.

Special problems exist in squeeze cementing oil wells with high bottom hole temperatures, because of the accelerated setting of the cement slurry, due to the abnormally high temperatures. Diesel oil slurries heretofore used have not always been successful, due to the limited time available for the introducing of the slurry because of accelerated setting of the cement. These slurries usually have failed to penetrate channels or formation openings because of the high fluid loss due to the separation of the solids from the diesel oil. This results in immobility and high friction which interfere with rapid penetration of the desired strata.

Furthermore, diesel oil slurries immediately thicken and rapidly set on contact with water, thus increasing the need for high pressure because of the high friction and the resulting high resistance. Hence these cementation processes heretofore have required special equipment and isolation of the water producing zone, and the use of diesel oil slurries has not been wholly satisfactory.

It is an object of this invention to provide a cementing composition that will not set except in contact with water, and when it is contacted by water it thins initially then sets slowly so as not to interfere with the desired penetration.

It is also an object of this invention to provide a squeeze cementing method that will only block the water producing zones and will not block the oil or gas producing zones.

Another object of this invention is to provide a method of squeeze cementing, and a cement composition that will have good penetration of channels and formation openings, that will have relatively low fluid loss, low friction and will have a delayed setting on contact with water.

Still another object of this invention is to provide a method and a cement composition adapted thereto that will not require high pressure and will easily penetrate the surrounding formation.

A further object of this invention is to provide an improved composition for cementing oil wells that will operate under low pressure, will preferentially penetrate water producing zones, rather then oil producing zones, will not damage oil producing zones and does not require high pressure.

These and other objects will be apparent to one skilled in the art together with the nature of the invention from the following description and claims.

We have found that a method of squeeze cementing requiring low pressure may be employed if the cement composition is made up with a hydrocarbon base having a gelling agent added thereto, for example, a slurry having an oil base which is gelled by adding to it a fatty acid and an alkali so as to produce within the oil a soap which has been found will produce a gel. This gel should have suspended therein an appropriate quantity of cement and ingredients to control the action of water on the cement.

A suitable slurry is prepared by adding a fatty acid and a caustic to a hydrocarbon fraction. After this mixture becomes viscous, a small quantity of non-ionic surface active agent (which is advantageously a condensation product of a substituted phenol and ethylene oxide) is stirred in. The desired amount of cement is then incorporated and a hydrophillic substance such as calcium chloride added to the mixture. This slurry is then pumped into the well and displaced out of the bore. The gelled oil acts as a carrying agent for the solids dispersed therein. The action of the condensation product of a substituted phenol and ethylene oxide and the calcium chloride causes a delayed reduction in viscosity of the carrying fluid and allows water when contacted by the slurry to penetrate the gelled oil film surrounding the cement particles slowly and thus ultimately hydrates the same and causes it to set.

Gelled oil can be prepared by mixing vigorously the following ingredients:

1,000 gallons kerosene, diesel oil, or crude oil
2 to 5 gallons liquid 50% sodium hydroxide
8 to 20 gallons red oil, tall oil, or commercial stearic acid The slurry is completed by adding to the above:

80 to 150 sacks of any type oil well cement
1 to 10 gallons of the condensation product of a substituted phenol and ethylene oxide
2 to 400 pounds powdered calcium chloride Our invention utilizing this improved composition has been extensively tested as set forth in the examples below with a very high degree of success.

*Example I*

Water had invaded an oil well in the Red Rock Field, Webster Parrish, Louisiana and had completely shut off the production of 500 barrels oil and 1½ million cubic feet of gas per day from the Smackover limestone at approximately 11,000 feet. Three attempts to diesel squeeze the well and one attempt to squeeze with a water slurry were unsuccessful because no appreciable amount of cement slurry could be squeezed out of the well bore. A slurry was prepared consisting of 500 gallons kerosene, 1½ gallons of 50% caustic solution, 50 pounds commercial stearic acid, 50 sacks common cement, 2½ gallons of the condensation product of one mole octyl phenol and nine moles ethylene oxide and 2 pounds powdered calcium chloride. A spearhead of 1,000 gallons of oil was pumped into the formation at a pressure of 5,500 p.s.i. followed by the slurry. The pressure necessary to displace the slurry out of the well slowly increased from 5,550 p.s.i. to 6,100 p.s.i. as the last of the slurry was cleared from the pipe. The day following the above treatment, the well was reperforated slightly higher than the previous perforations and the new perforations were treated with 500 gallons acid. After the acid treatment the well produced no water, 500 barrels oil and 1½ million cubic feet of gas per day.

*Example II*

A well in the White Field, Taylor County, Texas was producing 15 barrels of oil and 8 barrels of water per day from perforations at 2735 to 2743 opposite the Tannehill sand. A slurry consisting of 500 gallons kerosene, 1½ gallons of 50% caustic solution, 60 pounds commercial stearic acid, 50 sacks common cement, 2½ gallons of the condensation product of 1 mole octyl phenol and 9 moles ethylene oxide and 100 pounds powdered calcium chloride was pumped into the well. A packer was set above all perforations in the well so that both the oil producing and water producing zones of the well were exposed to entry by the slurry. Crude oil was pumped into the well ahead of the slurry and required 1,100 p.s.i. for displacement in the formation. The slurry required from 1,000 p.s.i. to 1,700 p.s.i. for displacement into the formation. The well was left shut in over night and opened for production the following day at which time is produced at the rate of 24 barrels oil and no water per day.

While in the above description and examples a condensation product of octyl phenol and ethylene oxide is disclosed as the non-ionic surface active agent, the following materials may also be used; ethylene oxide condensate of hydroabiebyl alcohol, sold by the Hercules Powder Company, under trademark AD-160; ethylene oxide condensate of fatty and or resin acids such as the Atlas Powder Company's MYRJ and Renox products; ethylene oxide condensate of fatty acid esters such as Atlas Powder Company's Tween products; ethylene oxide condensate of fatty acid amide, such as Armour Chemical Division's Ethomids; ethylene oxide condensate of mercaptans, such as Monsanto Chemical Company's Sterox 5.

The gelled oil slurry according to our invention has a viscosity which prevents the settling of the cement particles and helps insure penetration of the composition into channels and formation openings as a slurry of uniform composition, and also prevents fluid loss during penetration which would cause the separation of the cement and the carrying agent, and thereby insures uniform penetration of the whole slurry. The cement particles are wet with gelled oil and this prevents hydration and setting of the cement on contact with water until the water penetrates the film of gelled oil. This allows the squeeze cementing to be carried on at low pressures because of the low friction and the fact that the cement does not separate and harden and block the earth formation during the squeeze process.

After the slurry has been introduced, a sufficient time is allowed for the cement to set and only that part of the cement that has come in contact with water does set. Consequently, the water producing zones are blocked and the oil producing zones are not blocked. When the well is opened for production, any slurry which might have penetrated an oil or gas producing zone is readily removed therefrom and the oil or gas flows freely and does not usually require restimulation as is required in those methods of squeeze cementing in common use today.

Modification of the procedure to suit local conditions may be readily made and many other advantages will be apparent to one skilled in the art from the above specification, which is limited only by the claims attached hereto.

What is claimed is:

1. An improved method for low pressure squeeze cementing of oil and gas wells which comprises pumping into the well in which both water producing and oil or gas producing zones are exposed, a cement slurry comprising a liquid hydrocarbon containing sufficient alkali metal soap to form a gel, cement, calcium chloride, and a condensation product of a substituted phenol and ethylene oxide, whereby said slurry contacts and sets in said water producing zone, and removing by swabbing or allowing the well to produce the slurry portion which has not set.

2. An improved method of squeeze cementing oil and gas wells, which comprises pumping into the well which is producing both water and oil or gas, a spearhead of oil followed by a cement slurry comprising a liquid hydrocarbon containing sufficient alkali metal soap to form a gel, cement, calcium chloride, and a non-ionic wetting agent into the producing zone, allowing the slurry sufficient time to set and removing the unset slurry from the oil producing zone.

3. A non-aqueous cement slurry for cementing oil and gas wells, comprising a liquid hydrocarbon base, fatty acid, a caustic, a surface active agent, and cement, wherein said constituents are in about the following proportions:

| | | |
|---|---|---|
| Liquid hydrocarbon base | gallons | 1000 |
| Fatty acid | do | 8 to 20 |
| Caustic alkali | do | 2 to 5 |
| Surface active agent | do | 1 to 10 |
| Portland cement | sacks | 80 to 150 |

4. A non-aqueous cement slurry as defined in claim 3 wherein said liquid hydrocarbon base is selected from the group consisting of kerosene, diesel oil and crude oil.

5. A non-aqueous cement slurry as defined in claim 3 wherein said fatty acid is selected from the group consisting of red oil, tall oil, and commercial stearic acid.

6. A non-aqueous cement slurry as defined in claim 3, wherein said surface active agent is the condensation product of a substituted phenol and ethylene oxide.

7. A non-aqueous cement slurry as defined in claim 3, including powdered calcium chloride in the proportion of 2 to 400 pounds.

8. A non-aqueous cement slurry for squeeze cementing oil and gas wells comprising: a liquid hydrocarbon base, an alkali metal soap in an amount sufficient to produce a thixotropic gel, and Portland cement in the proportion of about 80–150 sacks per 1000 gallons of liquid petroleum.

9. An non-aqueous cement slurry as defined in claim 8, wherein said liquid hydrocarbon base is selected from the group consisting of kerosene, diesel oil and crude oil.

10. A non-aqueous cement slurry as defined in claim 8, wherein said alkali metal soap consists of a fatty acid and sodium hydroxide.

11. A non-aqueous cement slurry as defined in claim 10, wherein said fatty acid is selected from the group consisting of red oil, tall oil and commercial stearic acid.

12. An improved method of squeeze cementing oil and gas wells having both oil or gas and water producing zones which comprises pumping into said well a non-aqueous cement slurry containing a liquid hydrocarbon base, an alkali metal soap in an amount to produce a thixotropic gel, and Portland cement in the proportion of about 80–150 sacks per 1000 gallons of liquid petroleum base, subjecting said slurry to pressure and squeezing said slurry into a water producing zone contacted thereby, said water hydrating the cement, allowing the hydrated cement to set up in said water producing zone, and removing the slurry from the oil or gas producing zone.

13. An improved method of squeeze cementing oil and gas wells having both oil or gas and water producing zones which comprises pumping into said well a non-aqueous cement slurry containing a liquid hydrocarbon base, a fatty acid and sodium hydroxide in an amount to produce a thixotropic gel, and Portland cement in the proportion of about 80–150 sacks per 1000 gallons of liquid petroleum base, subjecting said slurry to pressure and squeezing said slurry into a water producing zone contacted thereby, said water hydrating the cement, allowing the hydrated cement to set up in said water producing zone, and removing the slurry from the oil or gas producing zone.

References Cited in the file of this patent

UNITED STATES PATENTS

| | | |
|---|---|---|
| 1,491,427 | Smit | Apr. 22, 1924 |
| 1,772,999 | Huber | Aug. 12, 1930 |
| 1,773,001 | Huber | Aug. 12, 1930 |
| 2,065,512 | Cannon | Dec. 29, 1936 |
| 2,654,674 | Frankenhoff | Oct. 6, 1953 |
| 2,769,498 | Huber | Nov. 6, 1956 |
| 2,776,713 | Morgan et al. | Jan. 8, 1957 |
| 2,782,857 | Clark et al. | Feb. 26, 1957 |
| 2,806,530 | Binkley | Sept. 17, 1957 |

OTHER REFERENCES

Sisley et al.: Enc. Surface Active Agents, page 219, pub. 1952 by Chemical Publishing Company, New York.

Dowell: Journal of Petroleum Tech., April 1955, advertisement opposite page 9.